US009766675B2

(12) United States Patent
Uan-zo-li et al.

(10) Patent No.: US 9,766,675 B2
(45) Date of Patent: Sep. 19, 2017

(54) METHODS AND APPARATUSES TO PROVIDE POWER IN IDLE STATES (71) Applicant: Intel Corporation, Santa Clara, CA (US)

(72) Inventors: Alexander B. Uan-zo-li, Hillsboro, OR (US); Vidoot Ponnala Rathnakar, Beaverton, OR (US); Barnes Cooper, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/960,264

(22) Filed: Dec. 4, 2015

(65) Prior Publication Data
US 2017/0160777 A1 Jun. 8, 2017

(51) Int. Cl.
*G06F 1/32* (2006.01)
*G06F 1/26* (2006.01)

(52) U.S. Cl.
CPC ............... *G06F 1/266* (2013.01); *G06F 1/26* (2013.01); *G06F 1/3203* (2013.01)

(58) Field of Classification Search
CPC ................................ G06F 1/3203; G06F 1/26
USPC ........................................................ 713/300
See application file for complete search history.

(56) References Cited

U.S. PATENT DOCUMENTS

| | | | | |
|---|---|---|---|---|
| 5,712,754 | A | * | 1/1998 | Sides ................... G06F 13/4081 361/18 |
| 6,523,128 | B1 | * | 2/2003 | Stapleton .............. G06F 1/3203 713/324 |
| 6,901,523 | B2 | | 5/2005 | Verdun |
| 7,574,614 | B2 | | 8/2009 | Koo |
| 8,008,953 | B1 | * | 8/2011 | Brumett, Jr. .......... H03K 17/166 327/109 |
| 2002/0194514 | A1 | | 12/2002 | Sanchez |
| 2006/0136759 | A1 | * | 6/2006 | Koo ....................... G06F 1/3215 713/300 |
| 2010/0096924 | A1 | * | 4/2010 | Zhu .......................... H02J 7/32 307/32 |
| 2011/0099389 | A1 | * | 4/2011 | Matula .................... G06F 1/266 713/300 |
| 2011/0271131 | A1 | * | 11/2011 | Lefebvre ................... G06F 1/26 713/323 |
| 2013/0290740 | A1 | * | 10/2013 | Ziarnik .................. G06F 9/4411 713/300 |
| 2015/0067376 | A1 | * | 3/2015 | Cueva Gonzalez ...... G06F 1/26 713/340 |
| 2015/0100812 | A1 | * | 4/2015 | Jing ........................ G06F 1/266 713/340 |
| 2015/0171631 | A1 | * | 6/2015 | Duell ........................ H02J 3/46 307/80 |
| 2015/0277530 | A1 | | 10/2015 | Rathnakar et al. |

(Continued)

OTHER PUBLICATIONS

International Search Report and the Written Opinion from International Application No. PCT/US2016/055769, mailed Jan. 23, 2017, 11 pages.

*Primary Examiner* — Jaweed A Abbaszadeh
*Assistant Examiner* — Volvick Derose
(74) *Attorney, Agent, or Firm* — Blakely Sokoloff Taylor and Zafman LLP (57) ABSTRACT

A load associated with one or more components coupled via one or more ports to a first power supply rail is monitored. The one or more components are switched to a second power supply rail, if the load is greater than a predetermined load.

18 Claims, 8 Drawing Sheets

(56) References Cited

U.S. PATENT DOCUMENTS

2015/0323979 A1* 11/2015 Kaestner ................ G06F 1/266
                                                    713/323
2016/0179155 A1*  6/2016 Lester ..................... G06F 1/266
                                                    713/300

* cited by examiner

METHODS AND APPARATUSES TO PROVIDE POWER IN IDLE STATES

FIELD

Embodiments described herein generally relate to a field of data processing systems, and in particular (but not exclusively) to power management for the data processing systems.

BACKGROUND

Generally, a power supply unit (PSU) converts a general-purpose (mains) alternating current (AC) electric power to a direct current (DC) power for components of a computer. Typically, desktop computer power supplies conform to the Advanced Technology eXtended (ATX) specification. An ATX power supply is used to provide DC voltages to power components on the computer and peripherals.

Typically, conventional power supplies in desktop systems contain a standby rail, which is rated to a maximum load capacity of 2.5 A and 5V, which results in an available power budget of 12.5 W which is not enough to power all components in an active state.

The total power draw on the 5V standby rail may exceed the power supply limit when a user plugs in one or more USB devices while a computer system is in an idle state. Generally, the idle state refers to the state when a computer system is not being used by any program. The user may plug-in the USB device to provide a light, a fan, to charge an external device e.g., a smartphone, or to provide other services. When the current drawn on the standby rail exceeds the limit of the power supply, the computer system will crash if the current draw is sustained.

Typically, the main power supply rail of the ATX power supply is always turned ON when the system is an idle state to supply power to a USB device and to prevent crash of the system that is very inefficient. Currently, the California Commission proposes stringent limitations on power consumption by desktop systems in idle states. The power consumption of the conventional ATX desktop power supplies, however, is more than about an order of magnitude greater than the proposed power consumption limit.

BRIEF DESCRIPTION OF THE DRAWINGS

Embodiments of the invention may best be understood by referring to the following description and accompanying drawings that are used to illustrate embodiments of the invention. In the drawings.

DETAILED DESCRIPTION

Methods and apparatuses to provide power for a data processing system in an idle state are described. At least one of a load or a power associated with one or more components of a data processing system coupled via one or more ports to a first power supply rail are monitored. The one or more components are switched to a second power supply rail when the at least one of the load or power is greater than a predetermined threshold.

In one embodiment, an apparatus to provide power to a data processing system in an idle state comprises a sensing circuit that senses a load on an auxiliary rail coupled to an auxiliary power supply of the PSU and compares the sensed load to a load limit for the auxiliary rail. If the sensed load exceeds the load limit, the sensing circuit provides a signal to a platform controller hub (PCH) to indicate to a power supply unit (PSU) to turn ON one or more main rails coupled to a main power supply of the PSU, while at the same time cutting power to the auxiliary power rail with high power consumption for a period of time predetermined by the platform, so that the data processing system is advantageously protected from a catastrophic failure. When the one or more PSU main rails are turned ON, the apparatus reconnects the one or more main rails of the PSU to continue providing power to the load which exceeded the limit.

Apparatuses and methods to provide power to a data processing system in an idle state described herein are cost efficient, as the entire existing power supply design does not need to be changed. A highly efficient standby power supply rail of the PSU is advantageously used to reduce the PSU losses. Generally, the standby power supply rails has a limitation on a current (e.g., about 2.5 A) that can be supplied on that rail. The current limitation limits the load which can be placed on that rail. If the load on the standby power supply rail increases above the limit a catastrophic failure can occur for the platform because the PSU will shut down. The standby power supply rail can be connected to one or more components (e.g., USB devices, serial ATA (SATA) devices, Peripheral Component Interconnect Express (PCIE) device, motherboard logic or other components of the data processing system). If one or more components are connected to the standby power supply rail, an overload condition may occur. In one embodiment, a load on a standby USB rail is actively monitored when the system is in an idle state, and the load is switched to connect to a main USB rail, if the overload condition occurs, as described in further detail below.

Conventional systems do not reconfigure the platform and the power supply power in a light load condition (e.g., in an idle state) when the load on the standby power supply rail increases. Embodiments of providing a power to a data processing system in an idle state as described herein provide a dynamic recovery mechanism in response to an overload condition and prevent a catastrophic failure from occurring without substantially increasing the cost to the system.

In the following description, various aspects of the illustrative implementations will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative implementations. However, it will be apparent to one skilled in the art that the embodiments of the present invention may be practiced without the specific details. In other instances, well-known features are omitted or simplified in order not to obscure the illustrative implementations.

Various operations will be described as multiple discrete operations in a manner that is most helpful in understanding the embodiments of present invention; however, the order of description should not be construed to imply that these operations are necessarily order dependent. In particular, these operations need not be performed in the order of presentation.

While certain exemplary embodiments are described and shown in the accompanying drawings, it is to be understood that such embodiments are merely illustrative and not restrictive, and that the embodiments are not restricted to the specific constructions and arrangements shown and described because modifications may occur to those ordinarily skilled in the art.

References throughout the specification to "one embodiment", "another embodiment", or "an embodiment" mean that a particular feature, structure, or characteristic described in connection with the embodiment is included in at least one embodiment. Thus, the appearance of the phrases, such as "one embodiment" and "an embodiment" in various places throughout the specification are not necessarily all referring to the same embodiment. Furthermore, the particular features, structures, or characteristics may be combined in any suitable manner in one or more embodiments.

Moreover, inventive aspects lie in less than all the features of a single disclosed embodiment. Thus, the claims following the Detailed Description are hereby expressly incorporated into this Detailed Description, with each claim standing on its own as a separate embodiment. While the exemplary embodiments have been described herein, those skilled in the art will recognize that these exemplary embodiments can be practiced with modification and alteration as described herein. The description is thus to be regarded as illustrative rather than limiting.

Figure 1:
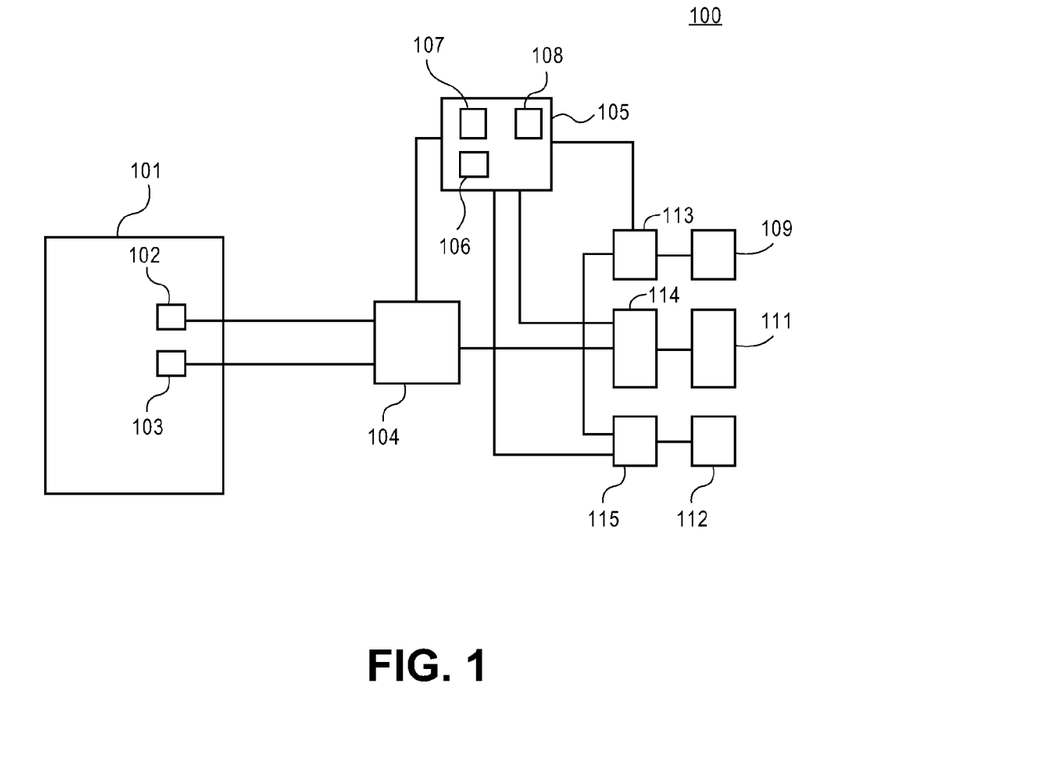
FIG. 1 is a view showing a block diagram of an apparatus to provide power in an idle state according to one embodiment.

FIG. 1 is view showing a block diagram of an apparatus 100 to provide power in an idle state according to one embodiment. A power supply unit (PSU) 101 comprises a plurality of rails, e.g., a standby power supply rail 102 and a main power supply rail 103 and possibly other rails. In one embodiment, standby power supply rail 102 is a 5V standby power supply rail, or any other voltage standby power supply rail. In one embodiment, main power supply rail 102 is a 5V main power supply rail, or any other voltage (e.g., 12V, 3.3 V) main power supply rail. In one embodiment, the standby power supply rail is coupled to an auxiliary stand-alone power supply, and the main power supply rail is coupled to a main power supply of the PSU 101. In one embodiment, the auxiliary power supply is separate from the main power supply of the PSU 101. In one embodiment, the auxiliary power supply includes a low voltage regulator that is coupled to a transformer that is independent from the transformer to which regulators of the main power supply of the PSU 101 are coupled. In one embodiment, the light-load efficiency of the auxiliary power supply is substantially higher than efficiency the main power supply. In one embodiment, the power consumed by the auxiliary power supply in light load is from about 50 mW to about 200 mW. In more specific embodiment, the power consumed by the auxiliary power supply is about 100 mW. In one embodiment, the power consumed by the main power supply is from about 0.5 W to about 2 W. In more specific embodiment, the power consumed by the main power supply is about 1 W.

In one embodiment, power supply unit 101 converts an AC power from an AC power source to a low voltage regulated DC current. In alternative embodiments, power supply unit 101 is an AC adapter, AC/DC adapter, AC/DC converter, or any other power supply unit. In one embodiment, PSU 101 is an ATX PSU. In one embodiment, main rail 103 includes one or more power supply rails e.g., 5V, 12V and 3.3V rails. Standby power supply rail 102 and main power supply rail 103 are coupled to a sensing circuit 105 via a switch 104. Sensing circuit 105 includes one or more sensors 106, a memory 107, and a microcontroller 108, as shown in FIG. 1. In one embodiment, circuit 105 comprises a hardware, a firmware, a software, or any combination thereof to perform methods described herein.

In one embodiment, the one or more sensors 106 are coupled to microcontroller 108 to monitor a load associated with the components 109, 111 and 112 that are coupled via the ports 113, 114 and 115 to the standby power supply rail 102 of the system in an idle state. Generally, an electrical load refers to one or more electrical components or portions of a circuit that consume electric power. In one embodiment, the one or more sensors 106 are coupled to microcontroller 108 to determine a power consumed by the load. In one embodiment, the one or more sensors 106 are coupled to microcontroller 108 to compare the load with a predetermined threshold stored in memory 108. In one embodiment, the predetermined threshold is calculated based on the power consumed by the one or more components, the standby rail power capacity, or a combination thereof. In one embodiment, the predetermined threshold is a maximum load allowed for the standby power supply rail according to an ATX specification to prevent the system from crashing, or any other threshold determined by design. If the load is greater than the predetermined threshold, the one or more sensors 106 are coupled to microcontroller 108 to send a signal to switch 104 to disconnect the standby power supply rail 102 from the ports 113, 114 and 115 and to connect main power supply rail 103 to the ports 113, 114 and 115.

Figure 8:
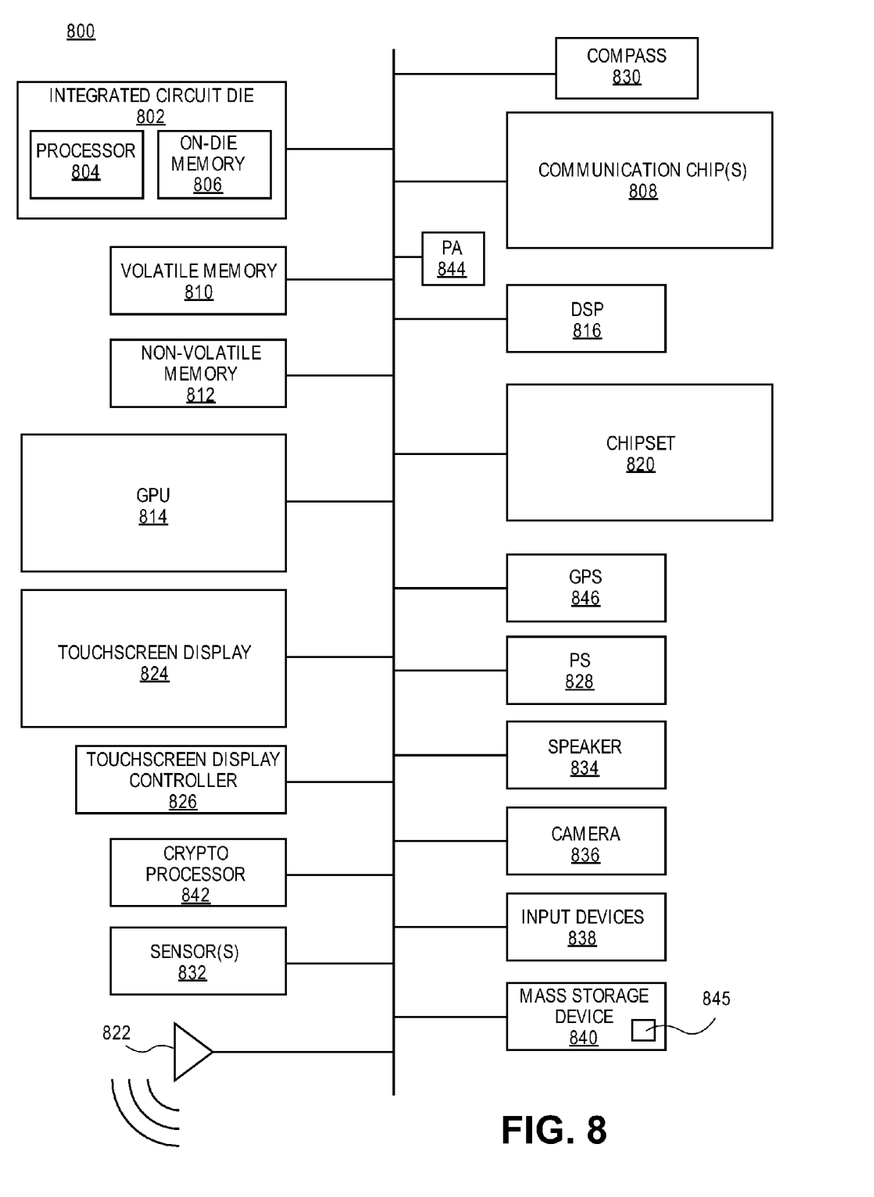
FIG. 8 illustrates a data processing system in accordance with one embodiment.

In one embodiment, the one or more sensors 106 are coupled to microcontroller 108 to monitor the load associated with one or more components coupled via the one or more ports to the main power supply rail 103. In one embodiment, the one or more sensors 106 are coupled to microcontroller 108 to compare the load with a predetermined threshold stored in memory 108. In one embodiment, the predetermined threshold is a maximum load for the standby power supply rail according to an ATX specification, or any other threshold determined by design. If the load is less than or equal to the predetermined threshold, the one or more sensors 106 are coupled to microcontroller 108 to send a signal to switch 104 to disconnect the main power supply rail 103 from the ports 113, 114 and 115 and to connect standby power supply rail 102 to the ports 113, 114 and 115. In one embodiment, the ports to which the components are connected are USB ports, or any other ports. In one embodiment, the one or more components comprise one or more USB devices, SATA devices, PCIE devices, motherboard logic devices, other components of the data processing system, or any combination thereof. In alternative embodiments, the one or more components comprise passive and active electronic components e.g., transistors, memories, capacitors, inductors, resistors, switches, integrated circuits, amplifiers, optoelectronic devices, or any other electronic devices. In one embodiment, apparatus 100 provides an electrical power to a desktop (DT) data processing system. In alternative embodiments, apparatus 100 provides electrical power for a data processing system, e.g., a computer system, a portable device, e.g., a mobile phone, a tablet, a laptop, a wrist device, a player, or any other device or any other system that needs the electrical power. In one embodiment, apparatus 100 provides electrical power to a data processing system as depicted in FIG. 8.

Figure 2:
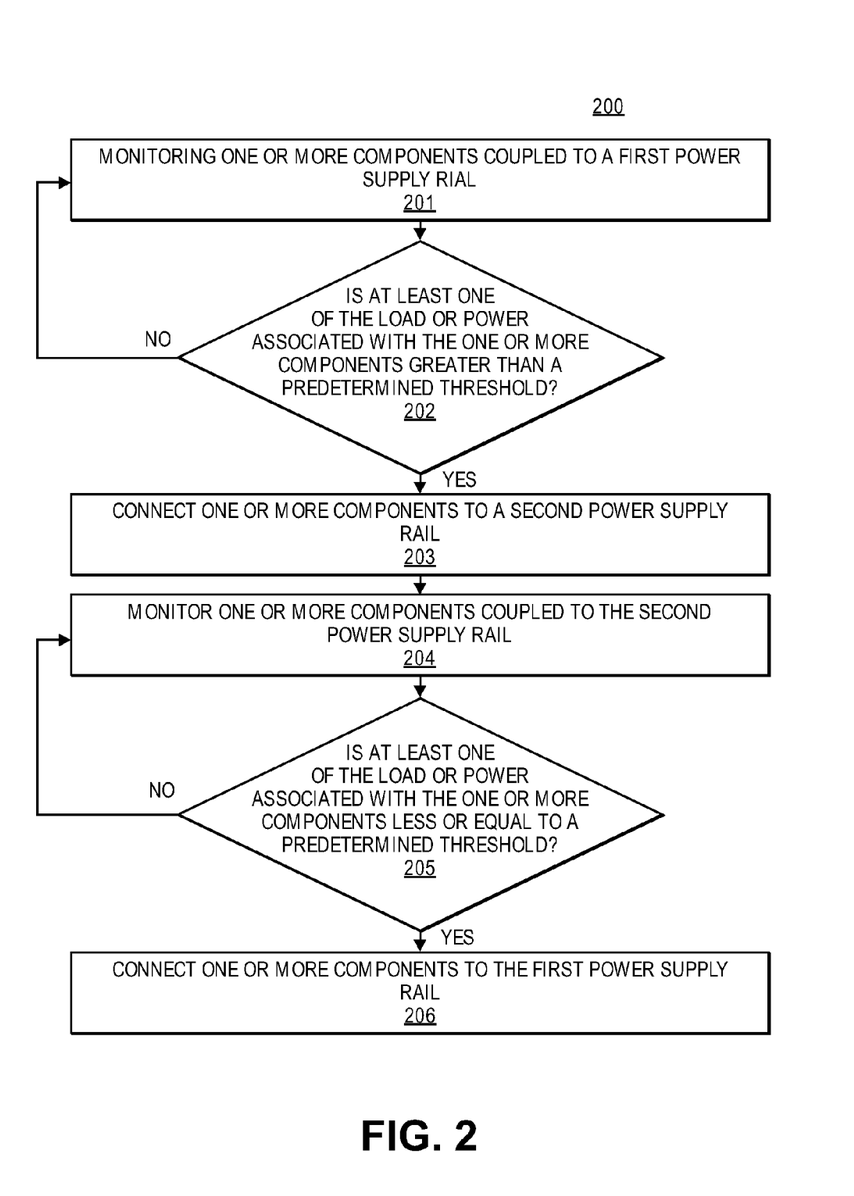
FIG. 2 is a flowchart of a method to provide power to a system in an idle state according to one embodiment.

FIG. 2 is a flowchart of a method 200 to provide power to a system in an idle state according to one embodiment. At block 201 one or more components coupled to a first power supply rail are monitored. In one embodiment, the first power supply rail is a standby power supply rail, as described above. At block 202 it is determined if at least one of a power or a load associated with the one or more components greater than a predetermined threshold. In one embodiment, the predetermined threshold is computed based on the power consumed by the components, the standby rail power capacity, or a combination thereof. In one embodiment, the predetermined threshold is a maximum load for the standby power supply rail according to the ATX specification, or any other load threshold determined by design. In one embodiment, the predetermined threshold is a maximum power capacity of the standby power supply rail according to the ATX specification, or any other power threshold determined by design. If at least one of the power of the load associated with the one or more components is not greater than the predetermined threshold, method 200 returns to block 201. In one embodiment, the predetermined threshold is a maximum load for the standby power supply rail according to a ATX specification, or any other load threshold determined by design. In another embodiment, the predetermined threshold is a maximum power for the standby power supply rail according to the ATX specification, or any other power threshold determined by design. In more specific embodiment, the predetermined threshold is in an approximate range from about 12 W to about 15 W. If the at least one of the power or the load associated with the one or more components is greater than the predetermined threshold, the second power supply is turned on, and at block 203 the one or more components are switched from the first power supply rail to a second power supply rail. In one embodiment, the second power supply rail is a main power supply rail, as described above. At block 204 one or more components that are coupled to the second power supply rail are monitored. At block 205 it is determined if at least one of the power or the load associated with the one or more components less than or equal to a predetermined threshold. In one embodiment, the predetermined threshold is a maximum load for the standby power supply rail according to the ATX specification, or any other threshold determined by design. If at least one of the power or the load associated with the one or more components is not less than or equal to the predetermined threshold, method 200 returns to block 204. If at least one of the power or the load associated with the one or more components is less than or equal to the predetermined threshold, at block 206 the one or more components are connected to the first power supply rail, as described above.

Figure 3:
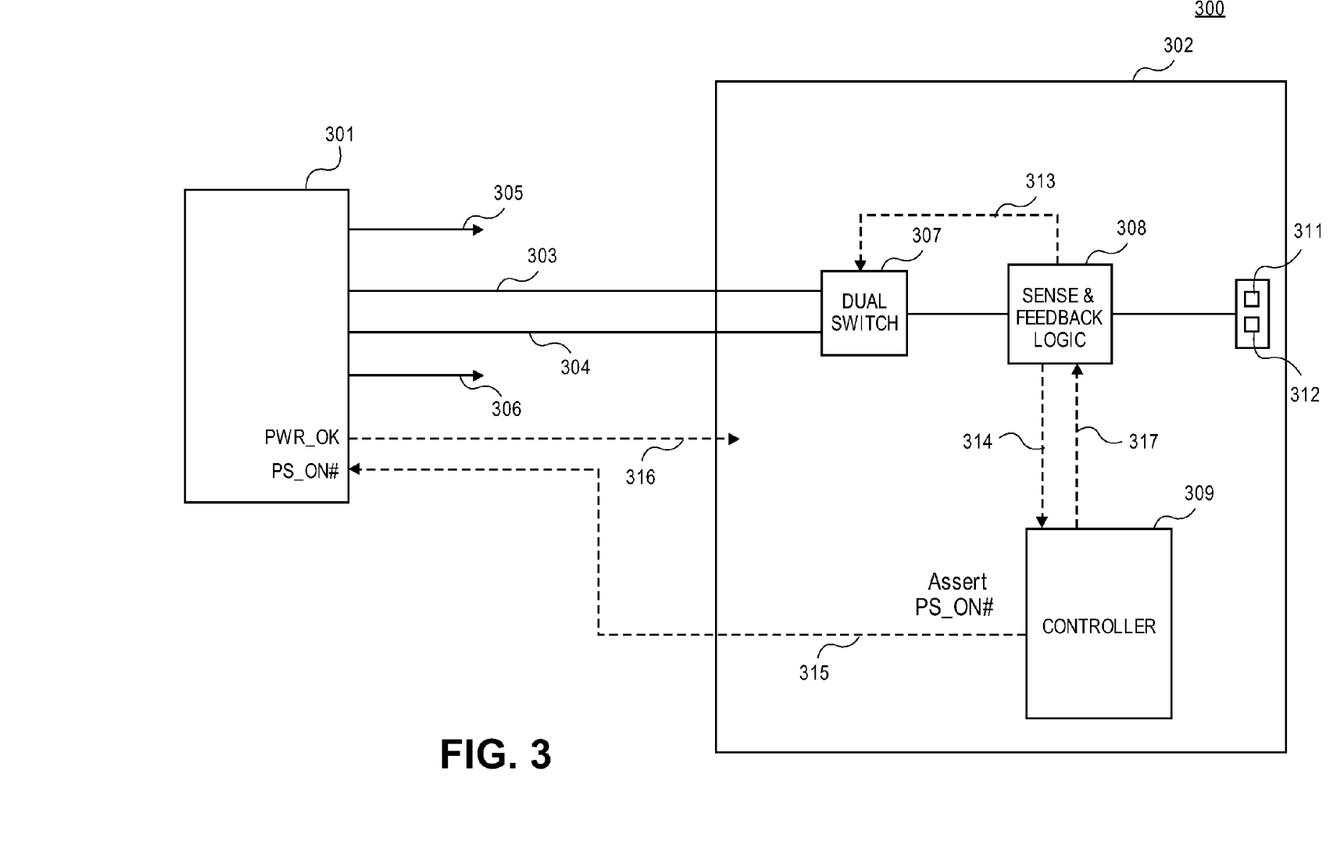
FIG. 3 is a view showing a block diagram of system to provide power in an idle state according to one embodiment.

FIG. 3 is a view showing a block diagram of system 300 to provide power in an idle state according to one embodiment. System 300 comprises a PSU 301, and a subsystem 302. Subsystem 302 comprises a dual switch 307, a sense and feedback logic circuit 308 and a controller 309. In one embodiment, controller 309 comprises a hardware, a firmware, a software, or any combination thereof to perform methods to provide power in an idle state described herein.

In one embodiment, controller 309 is a platform controller hub (PCH), or any other controller. As shown in FIG. 3, circuit 308 is coupled to a plurality of ports, e.g., a port 311 and 312 to connect to one or more components, e.g., one or more USB devices, SATA devices, PCIE devices, motherboard logic devices, or other device as described above. In one embodiment, ports 311 and 312 are part of the board. In another embodiment, ports 311 and 312 are separate from the board 302. PSU 301 includes a standby power supply rail 303 to provide a standby DC voltage using an auxiliary standalone power supply and a plurality of main power supply rails 304, 305 and 306 to provide DC voltages. In one non-limiting example, the standby power supply rail 303 is a 5V standby power supply rail, main power supply rail 304 is a 5V main power supply rail, main power supply rail 305 is a 12V main power supply rail, and main power supply rail 306 is a 3.3V main power supply rail. In one embodiment, standby power supply rail 303 represents the standby power supply rail 102. In one embodiment, main power supply rail 304 represents the main power supply rail 103. Dual switch 307 is used to connect the ports 311 and 312 to standby power supply rail 303 or to the main power supply rail 304.

In one embodiment, sense and feedback logic circuit 308 comprises a part of circuit 105. In one embodiment, controller 309 comprises a part of circuit 105. In one embodiment, the sense and feedback logic circuit 308 senses the current draw on the standby power supply rail 303 of the system in an idle state. The sense and feedback logic circuit 308 sends a signal to controller 309 to turn ON the main power supply rail 304 of the PSU 301, if the current on the standby power supply rail 303 is greater than a predetermined current threshold. In one embodiment, the predetermined current threshold is a maximum current for the standby power supply rail according to the ATX specification, or any other current predetermined by design. In one embodiment, the predetermined current threshold is about 3 A, which is traditional current level for the auxiliary PSU rail. If the current is greater than the predetermined current threshold, the sense and feedback logic circuit 308 sends a signal to switch 307 to disconnect the standby power supply rail 303 from the ports 311 and 312. If the current is greater than the predetermined current threshold, the sense and feedback logic circuit 308 sends a signal to controller 309 to turn ON the PSU 301 to provide power on the main power supply rail 304.

In one embodiment, if the sense and feedback logic circuit 308 senses that the current is greater than a predetermined current level, the sense and feedback logic sends a signal 313 to the dual switch 308 to disconnect the standby power supply rail 303 from at least one of the ports 311 and 312. In one embodiment, the standby power supply rail 303 is disconnected from all the ports. In another embodiment, the standby power supply rail 303 is selectively disconnected from at least one of the ports. The sense and feedback logic circuit 308 sends a signal 314 that indicates to the controller 309 that main power supply rail 304 needs to be turned ON. After receiving signal 314, controller 309 asserts a signal 315 (e.g., a PS_ON# signal) to turn PSU 301 ON that turns ON the main rails of the PSU 301. After the main rails are ramped up the PSU 301 sends a signal 316 (e.g., a PWR_OK signal) to the board 302 that indicates to the controller 309 that the main rails of the PSU 301 are turned ON. After receiving the signal 316, the controller 309 sends a signal 317 back to the sense and feedback logic circuit 309 indicating that the PSU main rails have ramped up. After receiving signal 317, the sense and feedback logic circuit 309 sends a signal 313 to the dual switch 307 to connect the main power supply rail 304 to the ports 311 and 312.

In one embodiment, if the sense and feedback logic circuit 308 determines that the current drawn from the main power supply rail 304 is below a predetermined limit for a predetermined amount of time, and the system is in an idle state, the sense and feedback logic sends a signal 313 to the dual switch 308 to disconnect the main power supply rail 304 from the ports 311 and 312. The sense and feedback logic circuit 308 sends a signal 314 to indicate to the controller 309 that main power supply rail 304 needs to be turned OFF. After receiving signal 314, controller 309 asserts a signal 315 (e.g., a PS_OFF# signal) to turn PSU 301 OFF that turns OFF the main rails of the PSU 301. After the main rails are turned OFF, the PSU 301 sends a signal 316 (e.g., a PWR_OFF signal) to the board 302 that indicates to the controller 309 that the main rails of the PSU 301 are turned OFF. After receiving the signal 316, the controller 309 sends a signal 317 back to the sense and feedback logic circuit 309 indicating that the PSU main rails have been turned OFF. After receiving signal 317, the sense and feedback logic circuit 309 sends a signal 313 to the dual switch 307 to connect the standby power supply rail 303 back to the ports 311 and 312.

Figure 4:
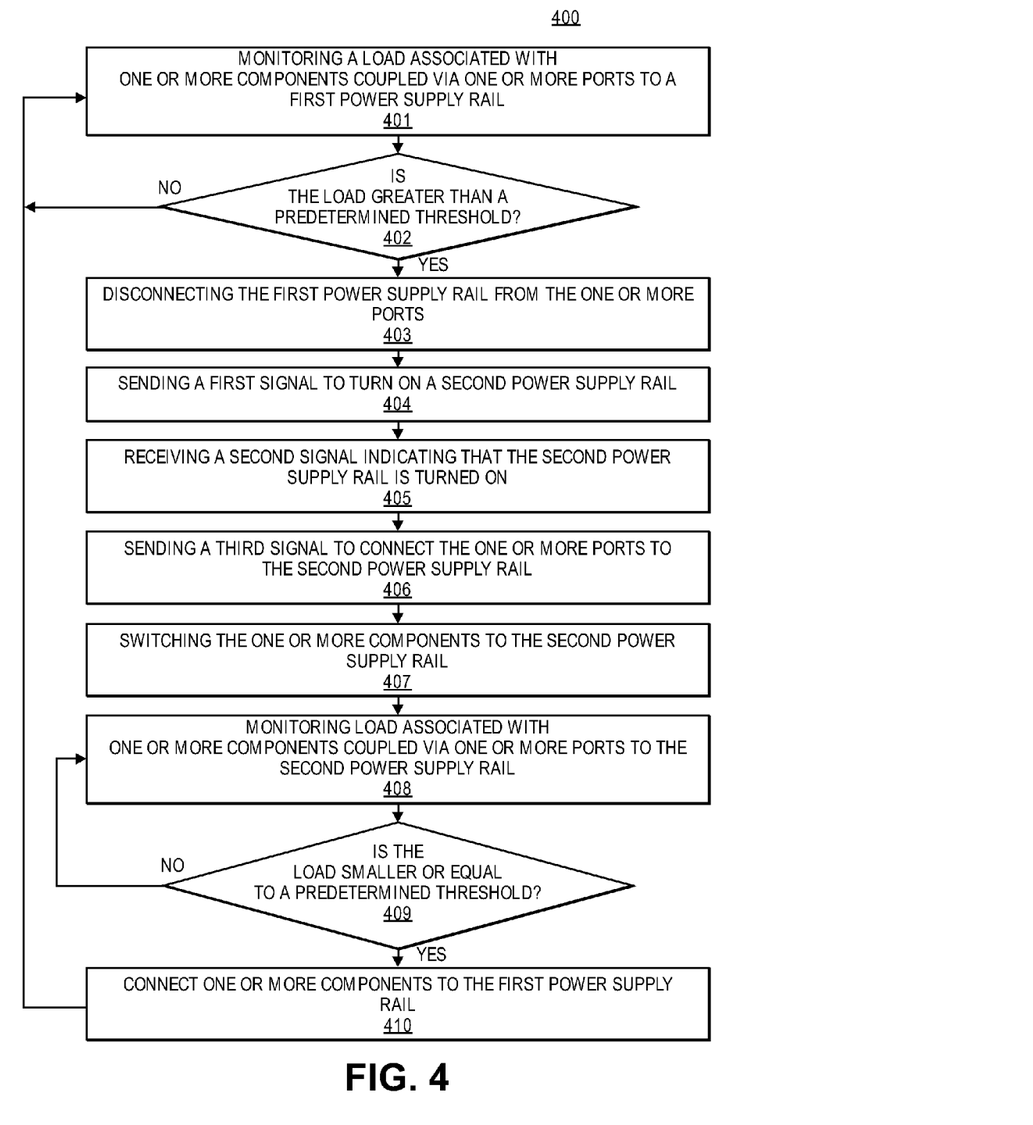
FIG. 4 is a flowchart of a method to provide power to a system in an idle state according to one embodiment.

FIG. 4 is a flowchart of a method 400 to provide power to a system in an idle state according to one embodiment. At block 401 a load associated with one or more components coupled via one or more ports to a first power supply rail is monitored (e.g., using circuit 308). In one embodiment, the first power supply trail is a standby power supply rail, as described above. At block 402 it is determined if the load is greater than a predetermined threshold. In one embodiment, the predetermined threshold is a maximum load for the standby power supply rail according to a ATX specification, or any other load threshold determined by design. In one embodiment, the predetermined load threshold is calculated based on the power consumed by the one or more components, the standby rail power capacity, or a combination thereof. If the load is not greater than the predetermined threshold, method 400 goes back to block 401. If the load is greater than the predetermined threshold, at block 403 the first power supply rail is disconnected from the one or more ports. At block 404 a first signal is sent that contains an indication to turn ON a second power supply rail. In one embodiment, a first signal is represented by signal 314. In one embodiment, the second power supply rail is a main power supply rail, as described above. At block 405 a second signal is received that contains an indication that the second power supply rail is turned ON. In one embodiment, the second signal is represented by one of the signals 316 or 317. At block 406 a third signal is sent to connect the one or more ports to the second power supply rail. In one embodiment, the third signal is represented by a signal 313, as described above. At block 407 the one or more components are switched (e.g., by the switch 307) from the first power supply rail to the second power supply rail. At block 408 the load associated with one or more components coupled via one or more ports to the second power supply rail is monitored (e.g., using circuit 308). At block 409, it is determined if the load associated with the one or more components coupled via the one or more ports to the second power supply rail is smaller or equal to a predetermined threshold. If the load on the second power supply rail is not smaller or equal to the predetermined threshold, method 400 returns to block 408. If the load associated with the one or more components is smaller or equal to a predetermined threshold, at block 410 the one or more components are switched back from the second power supply rail to the first power supply rail (e.g., using switch 307).

Figure 5:
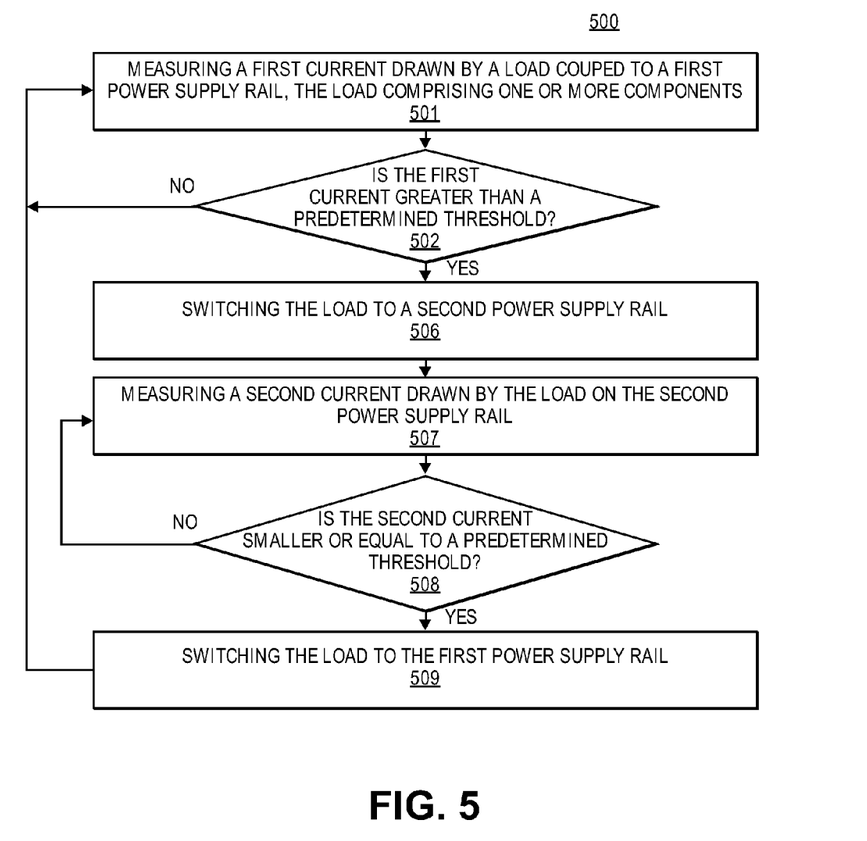
FIG. 5 is a flowchart of a method to provide power to a system in an idle state according to one embodiment.

FIG. 5 is a flowchart of a method 500 to provide power to a system in an idle state according to one embodiment. At block 501, a current drawn by a load coupled to a first power supply rail is measured (e.g., by circuit 105). In one embodiment, the first power supply rail is a standby power supply rail, as described above. At block 502 it is determined if the current is greater than a predetermined current threshold stored in a memory. In one embodiment, the predetermined current threshold is calculated based on the power consumed by the one or more components, the standby rail power capacity, or a combination thereof. In one embodiment, the predetermined current threshold is a maximum current for the standby power supply rail according to the ATX specification, or any other current threshold determined by design. In one embodiment, the predetermined current threshold is about 3 A, or any other predetermined current threshold. If the current is not greater than the predetermined current threshold, method 500 returns back to block 501.

If the current is greater than the predetermined current threshold, at block 506 the load is switched from the first power supply rail to a second power supply rail. In one embodiment, the second power supply rail is a main power supply rail, as described above. At block 507 a current drawn by the load on the second power supply rail is measured. At block 508 it is determined if the current drawn by the load on the second power supply rail is smaller or equal to the predetermined current threshold. If the current drawn by the load on the second power supply rail is not smaller or equal to the predetermined current threshold, method 500 returns to block 507. If the current drawn by the load on the second power supply rail is smaller or equal to the predetermined current threshold, at block 508 the load is switched (e.g., using switch 104) from the second power supply rail to the first power supply rail.

Figure 6:
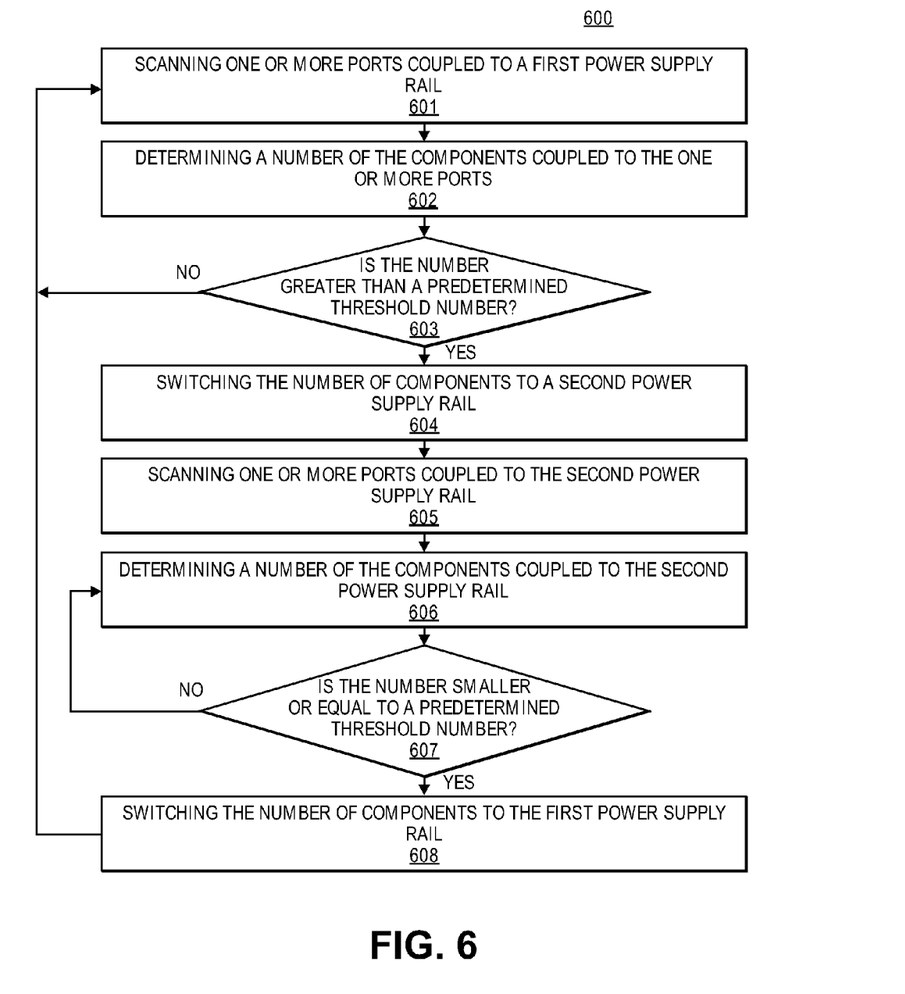
FIG. 6 is a flowchart of a method to provide power in an idle state according to one embodiment.

FIG. 6 is a flowchart of a method 600 to provide power in an idle state according to one embodiment. At block 601 one or more ports coupled to a first power supply rail are scanned (e.g., using circuit 105). At block 602 a number of the components that are coupled to the one or more ports is determined (e.g., by circuit 105). At block 603 it is determined if the number of the components greater than a predetermined number stored in a memory. In one embodiment, the predetermined number of the components is 2, 3, 4, 5, or any other number. In one embodiment, the predetermined number of the components is computed based on a predetermined load threshold, the power consumed by the components, the standby rail power capacity, or a combination thereof. In one embodiment, the number of the components is a maximum number of components that can be connected to the standby power supply rail according to the ATX specification, or any other threshold determined by design.

If the number of the components is not greater than the predetermined number, method 600 returns to block 601. If the number is greater than the predetermined number, at block 604 the components are switched (e.g., using switch 104) from the first power supply rail to a second power supply rail. In one embodiment, the second power supply rail is a main power supply rail, as described above. At block 605 the one or more ports coupled to the second power supply rail are scanned (e.g., using circuit 105). At block 606 a number of the components coupled to the second power supply rail is determined. At block 607 it is determined if the number of the components is smaller than or equal to a predetermined number stored in a memory. If the number of the components is not smaller than or equal to the predetermined number, method 600 returns to block 606. If the number of the components is smaller than or equal to the predetermined number, at block 608 the components are switched from the second power supply rail to the first power supply rail (e.g., using switch 104).

Figure 7:
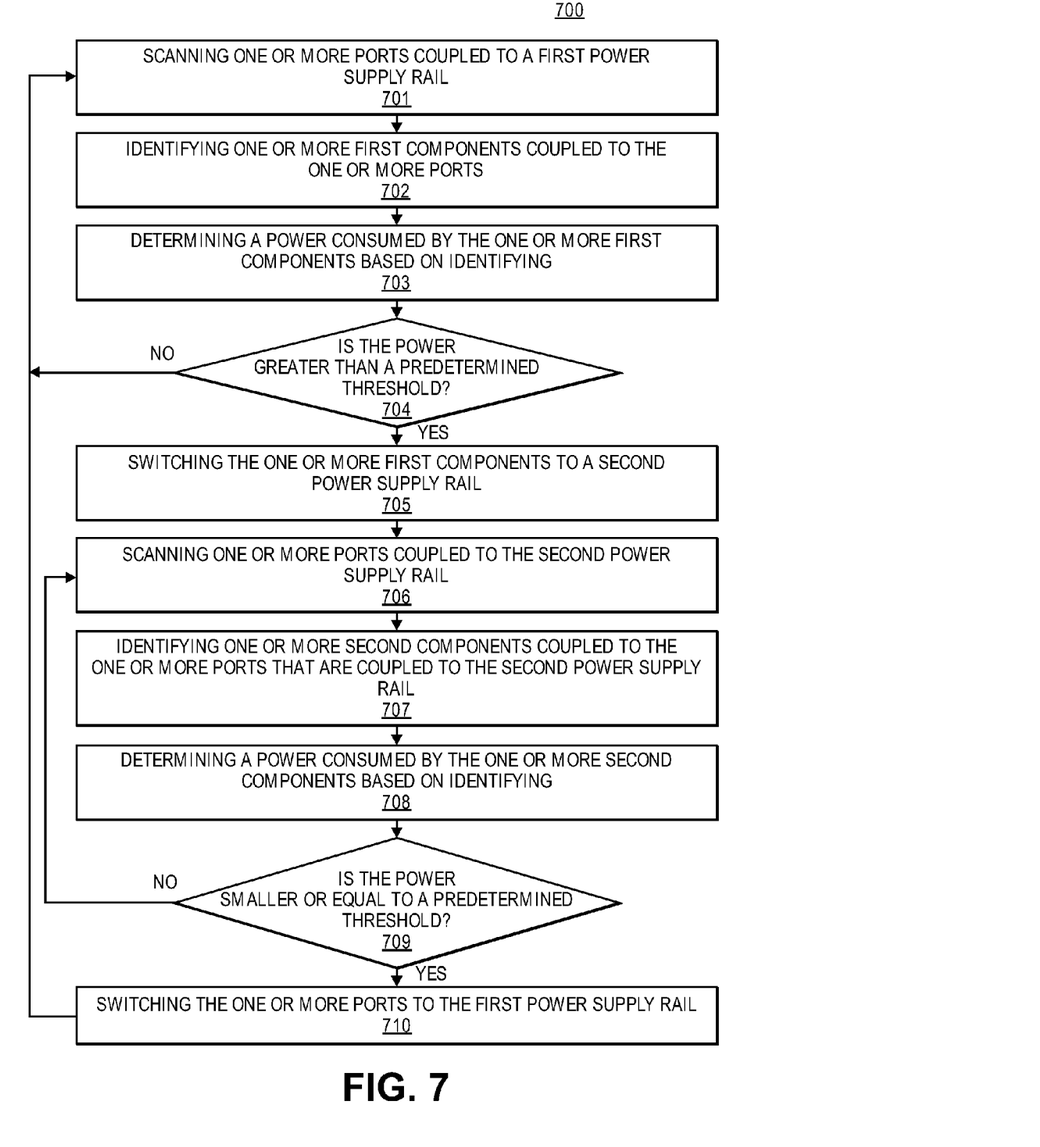
FIG. 7 is a flowchart of a method to provide power in an idle state according to one embodiment.

FIG. 7 is a flowchart of a method 700 to provide power in an idle state according to one embodiment. At block 701 one or more ports coupled to a first power supply rail are scanned (e.g., using circuit 105). In one embodiment, the first power supply rail is a standby power supply rail, as described above. At block 702 one or more components coupled to the one or more ports that are connected to the first power supply rail are identified (e.g., using circuit 105). In one embodiment, a data structure including power values consumed by corresponding components of the system is stored in a memory. In one embodiment, the data structure is a table that includes power values that are mapped to component identifiers.

At block 703 a power consumed by the one or more components is determined based on the identifying. In one embodiment, the power is looked up in the data structure based on the component identifier. At block 704 it is determined if the power greater than a predetermined power threshold. In one embodiment, the predetermined power threshold is calculated based on the power consumed by the one or more components, the standby rail power capacity, or a combination thereof. In one embodiment, the predetermined threshold is a maximum power for the standby power supply rail according to the ATX specification, or any other power threshold determined by design. In more specific embodiments, the predetermined power threshold is about 12.5 W, or any other power threshold.

If the power is not greater than the predetermined power threshold, method 700 returns to block 701. If the power is greater than the predetermined power threshold, at block 705 the one or more components are switched (e.g., using switch 104) from the first power supply rail to a second power supply rail. In one embodiment, the second power supply rail is a main power supply rail, as described above. At block 706 one or more ports coupled to the second power supply rail are scanned (e.g., using circuit 105). At block 707 one or more components that are coupled to the one or more ports coupled to the second power supply rail are identified. At block 708 a power consumed by the one or more components that are coupled to the one or more ports coupled to the second power supply rail is determined based on the identifying. At block 709 it is determined if the power consumed by the components on the second power supply rail is smaller than or equal to the predetermined threshold. If the power consumed by the components on the second power supply rail is not smaller than or equal to the predetermined threshold, method 700 returns to block 706. If the power consumed by the components on the second power supply rail is smaller than or equal to the predetermined threshold, at block 710 the one or more components coupled to the one or more ports are switched from the second power supply rail to the first power supply rail.

FIG. 8 illustrates a data processing system 800 in accordance with one embodiment. Data processing system 800 represents any data processing system that provides power in an idle state, as described herein with respect to FIGS. 1-7. In alternative embodiments, the data processing system 800 may be connected (e.g., networked) to other machines in a Local Area Network (LAN), an intranet, an extranet, or the Internet. The data processing system 800 may operate in the capacity of a server or a client machine in a client-server network environment, or as a peer machine in a peer-to-peer (or distributed) network environment.

In various embodiments, the data processing system 800 may be a desktop computer, a laptop computer, a netbook computer, a notebook computer, an ultrabook computer, a smartphone, a tablet, a personal digital assistant (PDA), an ultra mobile PC, a mobile phone, a wrist device, a server, a network router, a switch or bridge, a printer, a scanner, a monitor, a set-top box, an entertainment control unit, a digital camera, a portable music player, a web appliance, or a digital video recorder, or any machine capable of executing a set of instructions that specify actions to be taken by that data processing system. In further implementations, the data processing system 800 may be any other electronic device that processes data.

Further, while only a single data processing system is illustrated, the term "data processing system" shall also be taken to include any collection of data processing systems that individually or jointly execute a set (or multiple sets) of instructions to perform any one or more of the methodologies described herein.

A processor 804 represents one or more general-purpose processing devices such as a microprocessor, central processing unit, or other processing device. More particularly, the processor 804 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 804 may also be one or more special-purpose processing devices such as an application specific integrated circuit (ASIC), a field programmable gate array (FPGA), a digital signal processor (DSP), network processor, or the like. Processor 804 is configured to control a processing logic for performing the operations described herein with respect to FIGS. 1-7.

The data processing system 800 may include a number of components that are powered using methods described herein. In one embodiment, these components are attached to one or more motherboards. In an alternate embodiment, these components are fabricated onto a single system-on-a-chip (SoC) die rather than a motherboard. The components in the data processing system 800 include, but are not limited to, an integrated circuit die 802 and at least one communication chip 808. In some implementations the communication chip 808 is fabricated as part of the integrated circuit die 802. The integrated circuit die 802 may include processor 804, an on-die memory 806, often used as a cache memory, that can be provided by technologies such as embedded DRAM (eDRAM) or spin-transfer torque memory (STTM or STTM-RAM).

Data processing system 800 may include other components that may or may not be physically and electrically coupled to the motherboard or fabricated within an SoC die. These other components include, but are not limited to, a volatile memory 810 (e.g., DRAM), a non-volatile memory 812 (e.g., ROM or flash memory), a graphics processing unit 814 (GPU), a digital signal processor 816, a crypto processor 842 (a specialized processor that executes cryptographic algorithms within hardware), a chipset 820, an antenna 822, a display or a touchscreen display 824, a touchscreen controller 826, a power source (PC) 828, a battery, a power amplifier (PA) 844, a global positioning system (GPS) device 846, a compass 830, one or more sensors 832 (that may include a sensor to monitor a load associated with one or more components, a sensor to measure current, power or a combination thereof as described herein; a motion sensor, or other sensor), a speaker 834, a camera 836, user input devices 838 (e.g., a keyboard, mouse, stylus and touchpad), and a mass storage device 840 (e.g., a hard disk drive, compact disk (CD), digital versatile disk (DVD), and so forth).

In one embodiment, PS 828 is a part of the apparatus 100. In one embodiment, PS 828 is a part of the system 300. The communications chip 808 enables wireless communications for the transfer of data to and from the data processing system 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 808 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The data processing system 800 may include a plurality of communication chips 808. For instance, a first communication chip 808 may be dedicated to shorter range wireless communications such as Wi-Fi and Bluetooth and a second communication chip 808 may be dedicated to longer range wireless communications such as GPS, EDGE, GPRS, CDMA, WiMAX, LTE, Ev-DO, and others. The term "processor" may refer to any device or portion of a device that processes electronic data from registers and/or memory to transform that electronic data into other electronic data that may be stored in registers and/or memory.

The mass storage device 840 may include a machine-accessible storage medium (or more specifically a computer-readable storage medium) 845 on which is stored one or more sets of instructions (e.g., a software) embodying any one or more of the methodologies or functions described herein. The software may also reside, completely or at least partially, within the memory 810, memory 812, memory 806 and/or within the processor 804 during execution thereof by the data processing system 800, the on-die memory 806 and the processor 804 also constituting machine-readable storage media. The software may further be transmitted or received over a network via a network interface device.

While the machine-accessible storage medium 845 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the embodiments of the present invention. The term "machine-readable storage medium" shall accordingly be taken to include, but not be limited to, solid-state memories, and optical and magnetic media.

The above description of illustrated implementations of the invention, including what is described in the Abstract, is not intended to be exhaustive or to limit the embodiments of the invention to the precise forms disclosed. While specific implementations of, and examples for, the embodiments of the invention are described herein for illustrative purposes, various equivalent modifications are possible within the scope of the embodiments of the invention, as those skilled in the relevant art will recognize.

These modifications may be made to the embodiments of the invention in light of the above detailed description. The terms used in the following claims should not be construed to limit the embodiments of the invention to the specific implementations disclosed in the specification and the claims. Rather, the scope of the embodiments of the invention is to be determined entirely by the following claims, which are to be construed in accordance with established doctrines of claim interpretation.

The following examples pertain to further embodiments:

In one embodiment, a method to provide a power to a system in an idle state comprises monitoring a load associated with one or more components coupled via one or more ports to a first power supply rail; if the load is greater than a predetermined threshold, turning on a second power supply rail; and switching the one or more components to the second power supply rail.

In one embodiment, a method to provide a power to a system in an idle state comprises monitoring a load associated with one or more components coupled via one or more ports to a first power supply rail; disconnecting the first power supply rail from the one or more ports; and switching the one or more components to a second power supply rail, if the load is greater than a predetermined threshold.

In one embodiment, a method to provide a power to a system in an idle state comprises monitoring a load associated with one or more components coupled via one or more ports to a first power supply rail; determining a power consumed by the load; and switching the one or more components to a second power supply rail, if the load is greater than a predetermined threshold.

In one embodiment, a method to provide a power to a system in an idle state comprises monitoring a load associated with one or more components coupled via one or more ports to a first power supply rail; if the load is greater than a predetermined threshold, turning on a second power supply rail; and switching the one or more components to the second power supply rail; monitoring the load associated with the one or more components coupled via the one or more ports to the second power supply rail; and if the load is less than a predetermined load, switching the one or more components to the first power supply rail, and switching off the second power supply rail.

In one embodiment, a method to provide a power to a system in an idle state comprises monitoring a load associated with one or more components coupled via one or more ports to a first power supply rail; and switching the one or more components to a second power supply rail, if the load is greater than a predetermined threshold, wherein the first power supply rail is coupled to an auxiliary power supply, and the second power supply rail is coupled to a main power supply.

In one embodiment, a method to provide a power to a system in an idle state comprises monitoring a load associated with one or more components coupled via one or more ports to a first power supply rail; sending a first signal to turn on the second power supply rail; and switching the one or more components to a second power supply rail, if the load is greater than a predetermined threshold.

In one embodiment, a method to provide a power to a system in an idle state comprises monitoring a load associated with one or more components coupled via one or more ports to a first power supply rail; receiving a second signal indicating that the second power supply rail is turned on; and sending a third signal to connect the one or more ports to the second power supply rail and switching the one or more components to a second power supply rail, if the load is greater than a predetermined threshold.

In one embodiment, a method to provide a power to a system in an idle state comprises monitoring a load associated with one or more components coupled via one or more ports to a first power supply rail; sensing a first current drawn on the first power supply rail, and switching the one or more components to a second power supply rail, if the first current is greater than a predetermined current.

In one embodiment, a method to provide a power to a system in an idle state comprises monitoring a load associated with one or more components coupled via one or more ports to a first power supply rail; determining a number of the components coupled to the first power supply rail, and switching the one or more components to a second power supply rail, if the number of components is greater than a predetermined number.

In one embodiment, a method to provide a power to a system in an idle state comprises monitoring a load associated with one or more components coupled via one or more ports to a first power supply rail; identifying the one or more components to determine; and switching the one or more components to a second power supply rail if it is determined that the load is greater than a predetermined threshold based on the identifying.

In one embodiment, a method to provide a power to a system in an idle state comprises monitoring a load associated with one or more components coupled via one or more ports to a first power supply rail; and switching the one or more components to a second power supply rail, if the load is greater than a predetermined threshold, wherein the one or more components comprise a USB device, a SATA device, a PCIE device, a motherboard logic, or any combination thereof.

A non-transitory machine readable medium comprising instructions that cause a data processing system to perform a method to provide a power in an idle state comprising monitoring a load associated with one or more components coupled via one or more ports to a first power supply rail; if the load is greater than a predetermined threshold, turning on a second power supply rail; and switching the one or more components to the second power supply rail.

A non-transitory machine readable medium comprising instructions that cause a data processing system to perform a method to provide a power in an idle state comprising; monitoring a load associated with one or more components coupled via one or more ports to a first power supply rail; disconnecting the first power supply rail from the one or more ports; and switching the one or more components to a second power supply rail, if the load is greater than a predetermined threshold.

A non-transitory machine readable medium comprising instructions that cause a data processing system to perform a method to provide a power in an idle state comprising; monitoring a load associated with one or more components coupled via one or more ports to a first power supply rail; determining a power consumed by the load; and switching the one or more components to a second power supply rail, if the load is greater than a predetermined threshold.

A non-transitory machine readable medium comprising instructions that cause a data processing system to perform a method to provide a power in an idle state comprising monitoring a load associated with one or more components coupled via one or more ports to a first power supply rail; if the load is greater than a predetermined threshold, turning on a second power supply rail; and switching the one or more components to the second power supply rail; monitoring the load associated with the one or more components coupled via the one or more ports to the second power supply rail; and if the load is less than a predetermined load, switching the one or more components to the first power supply rail, and switching off the second power supply rail.

A non-transitory machine readable medium comprising instructions that cause a data processing system to perform a method to provide a power in an idle state comprising monitoring a load associated with one or more components coupled via one or more ports to a first power supply rail; and switching the one or more components to a second power supply rail, if the load is greater than a predetermined threshold, wherein the first power supply rail is coupled to an auxiliary power supply, and the second power supply rail is coupled to a main power supply.

A non-transitory machine readable medium comprising instructions that cause a data processing system to perform a method to provide a power in an idle state comprising; monitoring a load associated with one or more components coupled via one or more ports to a first power supply rail; sending a first signal to turn on the second power supply rail; and switching the one or more components to a second power supply rail, if the load is greater than a predetermined threshold.

A non-transitory machine readable medium comprising instructions that cause a data processing system to perform a method to provide a power in an idle state comprising monitoring a load associated with one or more components coupled via one or more ports to a first power supply rail; receiving a second signal indicating that the second power supply rail is turned on; sending a third signal to connect the one or more ports to the second power supply rail; and switching the one or more components to a second power supply rail, if the load is greater than a predetermined threshold.

A non-transitory machine readable medium comprising instructions that cause a data processing system to perform a method to provide a power in an idle state comprising monitoring a load associated with one or more components coupled via one or more ports to a first power supply rail; sensing a first current drawn on the first power supply rail, wherein the one or more ports are switched to the second power supply rail; and switching the one or more components to a second power supply rail, if the first current is greater than a predetermined current.

A non-transitory machine readable medium comprising instructions that cause a data processing system to perform a method to provide a power in an idle state comprising monitoring a load associated with one or more components coupled via one or more ports to a first power supply rail; determining a number of components coupled to the first power supply rail and switching the one or more components to a second power supply rail, wherein the one or more ports are switched to the second power supply rail, if the number of components is greater than a predetermined number.

A non-transitory machine readable medium comprising instructions that cause a data processing system to perform a method to provide a power in an idle state comprising monitoring a load associated with one or more components coupled via one or more ports to a first power supply rail; identifying one or more components coupled to the first power supply rail and switching the one or more components to a second power supply rail, wherein the one or more ports are switched to the second power supply rail based on the identified one or more components.

A non-transitory machine readable medium comprising instructions that cause a data processing system to perform a method to provide a power in an idle state comprising monitoring a load associated with one or more components coupled via one or more ports to a first power supply rail; and switching the one or more components to a second power supply rail, if the load is greater than a predetermined threshold, wherein the one or more components comprise a USB device, a SATA device, a PCIE device, a motherboard logic, or any combination thereof.

A system to provide a power in an idle state comprises a memory; and a processor coupled to the memory, wherein the processor is configured to monitor a load associated with one or more components coupled via one or more ports to a first power supply rail; wherein the processor is configured to turn on a second power supply rail; and wherein the processor is configured to switch the one or more components to the second power supply rail, if the load is greater than a predetermined threshold.

A system to provide a power in an idle state comprises a memory; and a processor coupled to the memory, wherein the processor is configured to monitor a load associated with one or more components coupled via one or more ports to a first power supply rail; wherein the processor is configured to disconnect the first power supply rail from the one or more ports; and wherein the processor is configured to switch the one or more components to a second power supply rail, if the load is greater than a predetermined threshold.

A system to provide a power in an idle state comprises a memory; and a processor coupled to the memory, wherein the processor is configured to monitor a load associated with one or more components coupled via one or more ports to a first power supply rail; wherein the processor is configured to determine a power consumed by the load; and wherein the processor is configured to switch the one or more components to a second power supply rail, if the load is greater than a predetermined threshold.

A system to provide a power in an idle state comprises a memory; and a processor coupled to the memory, wherein the processor is configured to monitor a load associated with one or more components coupled via one or more ports to a first power supply rail; wherein the processor is configured to turn on a second power supply rail; wherein the processor is configured to switch the one or more components to the second power supply rail, if the load is greater than a predetermined threshold, wherein the processor is configured to monitor the load associated with the one or more components coupled via the one or more ports to the second power supply rail; and wherein if the load is less than a predetermined load, the processor is configured to switch the one or more components to the first power supply rail, and switch off the second power supply rail.

A system to provide a power in an idle state comprises a memory; and a processor coupled to the memory, wherein the processor is configured to monitor a load associated with one or more components coupled via one or more ports to a first power supply rail; and wherein the processor is configured to switch the one or more components to a second power supply rail, if the load is greater than a predetermined threshold, wherein the first power supply rail is coupled to an auxiliary power supply, and the second power supply rail is coupled to a main power supply.

A system to provide a power in an idle state comprises a memory; and a processor coupled to the memory, one or more sensors coupled to the processor; wherein the processor is configured to monitor a load associated with one or more components coupled via one or more ports to a first power supply rail; and wherein the processor is configured to switch the one or more components to a second power supply rail, if the load is greater than a predetermined threshold.

A system to provide a power in an idle state comprises a memory; and a processor coupled to the memory, wherein the processor is configured to monitor a load associated with one or more components coupled via one or more ports to a first power supply rail; wherein the processor is configured to send a first signal to turn on the second power supply rail; and wherein the processor is configured to switch the one or more components to a second power supply rail, if the load is greater than a predetermined threshold.

A system to provide a power in an idle state comprises a memory; and a processor coupled to the memory, wherein the processor is configured to monitor a load associated with one or more components coupled via one or more ports to a first power supply rail; wherein the processor is configured to receive a second signal indicating that the second power supply rail is turned on; wherein the processor is configured to send a third signal to connect the one or more ports to the second power supply rail; and wherein the processor is configured to switch the one or more components to a second power supply rail, if the load is greater than a predetermined threshold.

A system to provide a power in an idle state comprises a memory; and a processor coupled to the memory, wherein the processor is configured to monitor a load associated with one or more components coupled via one or more ports to a first power supply rail; wherein the processor is configured to determine a first current drawn on the first power supply rail and wherein the processor is configured to switch the one or more components to a second power supply rail, if the first current is greater than a predetermined current.

A system to provide a power in an idle state comprises a memory; and a processor coupled to the memory, wherein the processor is configured to monitor a load associated with one or more components coupled via one or more ports to a first power supply rail; wherein the processor is configured to determine a number of the components coupled to the first power supply rail; and wherein the processor is configured to switch the one or more components to a second power supply rail, if the number of the components is greater than a predetermined number.

A system to provide a power in an idle state comprises a memory; and a processor coupled to the memory, wherein the processor is configured to monitor a load associated with one or more components coupled via one or more ports to a first power supply rail; wherein the processor is configured to identify the one or more components; and wherein the processor is configured to switch the one or more components to a second power supply rail based on the identifying.

A system to provide a power in an idle state comprises a memory; and a processor coupled to the memory, wherein the processor is configured to monitor a load associated with one or more components coupled via one or more ports to a first power supply rail; and wherein the processor is configured to switch the one or more components to a second power supply rail, if the load is greater than a predetermined threshold, wherein the one or more components comprise a USB device, a SATA device, a PCIE device, a motherboard logic, or any combination thereof.

What is claimed is:

1. A method to provide power to a system in an idle state comprising:
monitoring a load associated with one or more components coupled via one or more ports to a first power supply rail that is a standby power supply rail of the system in the idle state;
determining a number of the components coupled to the first power supply rail;
if the load is greater than a predetermined load,
turning on a second power supply rail that is a main power supply rail; and
switching the one or more components to the second power supply rail,
wherein one or more components are switched to the second power supply rail, if the number of components is greater than a predetermined number.

2. The method of claim 1, further comprising
disconnecting the first power supply rail from the one or more ports.

3. The method of claim 1, further comprising
determining a power consumed by the load.

4. The method of claim 1, further comprising
monitoring the load associated with the one or more components coupled via the one or more ports to the second power supply rail; and
if the load is less than a predetermined load,
switching the one or more components to the first power supply rail; and
switching off the second power supply rail.

5. The method of claim 1, further comprising
sensing a first current drawn on the first power supply rail, wherein the load is switched to the second power supply rail, if the first current is greater than a predetermined current.

6. The method of claim 1, further comprising
identifying the one or more components, wherein the load is switched to the second power supply rail based on the identifying.

7. A non-transitory machine readable medium comprising instructions that cause a data processing system to perform a method to provide power in an idle state comprising:
monitoring a load associated with one or more components coupled via one or more ports to a first power supply rail that is a standby power supply rail of the system in the idle state;
determining a number of the components coupled to the first power supply rail;
if the load is greater than a predetermined load,
turning on a second power supply rail that is a main power supply rail; and
switching the one or more components to the second power supply rail,
wherein one or more components are switched to the second power supply rail, if the number of components is greater than a predetermined number.

8. The non-transitory machine readable medium of claim 7, further comprising instructions that cause the data processing system to perform operations comprising
disconnecting the first power supply rail from the one or more ports.

9. The non-transitory machine readable medium of claim 7, further comprising instructions that cause the data processing system to perform operations comprising
determining a power consumed by the load.

10. The non-transitory machine readable medium of claim 7, further comprising instructions that cause the data processing system to perform operations comprising
monitoring the load associated with the one or more components coupled via the one or more ports to the second power supply rail; and
if the load is less than a predetermined load,
switching the one or more components to the first power supply rail; and
switching off the second power supply rail.

11. The non-transitory machine readable medium of claim 7, further comprising instructions that cause the data processing system to perform operations comprising
sensing a first current drawn on the first power supply rail, wherein the load is switched to the second power supply rail, if the first current is greater than a predetermined current.

12. The non-transitory machine readable medium of claim 7, further comprising instructions that cause the data processing system to perform operations comprising
identifying one or more components coupled to the first power supply rail, wherein the load is switched to the second power supply rail based on the identified one or more components.

13. A system to provide a power in an idle state comprising: a memory; and a processor coupled to the memory, wherein the processor is configured to:
monitoring a load associated with one or more components coupled via one or more ports to a first power supply rail that is a standby power supply rail of the system in the idle state; wherein the processor is configured to determining a number of the components coupled to the first power supply rail; wherein if the load is greater than a predetermined load, the processor is configured to turning on a second power supply rail that is a main power supply rail; and to switch the one or more components to the second power supply rail, wherein one or more components are switched to the second power supply rail, if the number of components is greater than a predetermined number.

14. The system of claim 13, wherein the processor is configured to disconnect the first power supply rail from the one or more ports.

15. The system of claim 13, wherein the processor is configured to determine a power consumed by the load.

16. The system of claim 13, wherein the processor is configured to monitor the load associated with the one or more components coupled via the one or more ports to the second power supply rail; and wherein if the load is less than a predetermined load, the processor is configured to switch the one or more components to the first power supply rail, and switch off the second power supply rail.

17. The system of claim 13, further comprising one or more sensors coupled to the processor.

18. The system of claim 13, wherein the one or more components comprise a USB device, a SATA device, a PCIE device, a motherboard logic, or any combination thereof.

* * * * *